United States Patent Office 3,323,039
Patented May 30, 1967

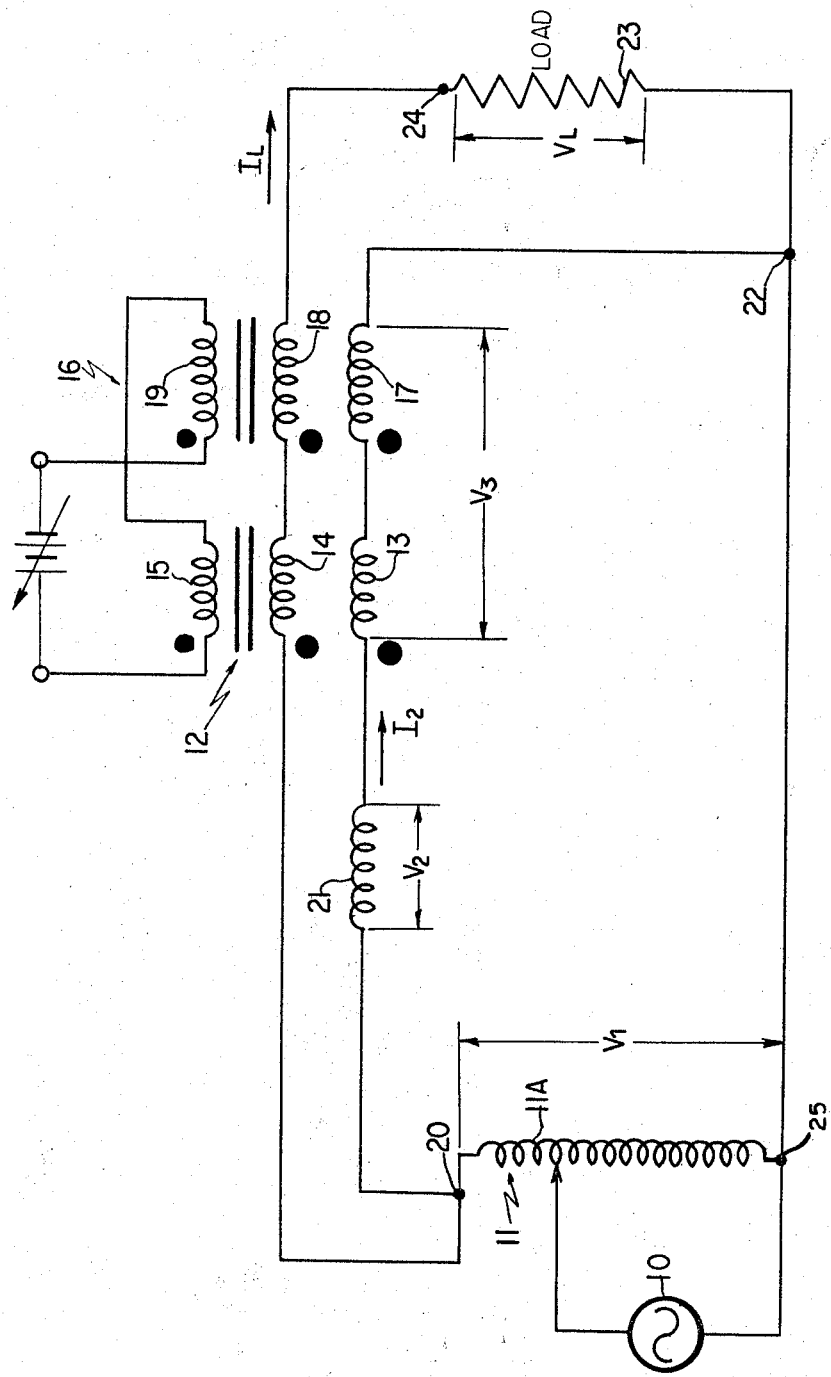

3,323,039
MAGNETIC AMPLIFIER VOLTAGE
REGULATOR SYSTEM
Alexander Kusko, Newton Center, Mass., assignor to Basic Products Corporation, Milwaukee, Wis., a corporation of Wisconsin
Filed Dec. 5, 1963, Ser. No. 328,310
2 Claims. (Cl. 323—45)

ABSTRACT OF THE DISCLOSURE

A constant voltage transformer-regulator having a plurality of magnetic amplifiers associated therewith, each magamp comprising a separate core element having a gate winding, an auxiliary winding, and a D.C. control winding mounted thereon with the respective windings of each core serially connected, the D.C. control windings being oppositely wound. The auxiliary windings are connected to the transformer in series with a reactor. The gate windings are connected to the transformer in series with the load.

This invention relates to a power modulator arrangement for controlling A.C. power to a load.

In the prior art, A.C. power modulation with static devices usually was carried out with variable impedance means, such as magnetic amplifiers and saturable reactors, which absorbed a portion of the applied voltage and thus acted to reduce the output as compared to the input.

One of the objects of the invention is to provide a power modulator which will enable regulation of the A.C. output voltage of a power modulator for various input voltage conditions and also preserve reasonable waveform and reasonable speed of response.

In one aspect of the invention, a transformer, such as an autotransformer, is connected to a source of A.C. At least a pair of saturable reactor means are provided, each having a gate winding, an auxiliary winding and a control winding. The auxiliary windings on each core element or reactor is connected in series with each other and one portion of the transformer through a reactance, the other side being connected to the other side of the transformer, such being a subsidiary circuit. The pair of gate windings are series connected to the load and to the autotransformer, such being the main circuit. The connections are such that the saturable reactors develop an opposing voltage to the input voltage by generating a current in the subsidiary circuit for the purpose of generating a bucking voltage in the main circuit.

The above and other objects, advantages and features of the invention will become apparent from the following description and drawing which are merely exemplary.

The drawing shows a schematic wiring diagram of one form of the invention.

Referring to the figure, A.C. power supply 10 is connected to transformer 11 which in the form shown is an autotransformer. A saturable reactor shown generally at 12 has an auxiliary winding 13, a gate winding 14 and control winding 15. Saturable reactor 16 likewise has an auxiliary winding 17, a gate winding 18 and a control winding 19. Preferably, windings 13 and 17 have the same number of turns and gate windings 14 and 18 have the same number of turns. Each of the saturable reactors is seen to have at least one gate winding, one auxiliary winding and a control winding per core element, there being at least two core elements. It is, of course, possible to use more sets of gate and control windings if desired.

Auxiliary windings 13 and 17 are connected to one end 20 of the autotransformer 11 in series with an A.C. reactor 21. The other end of the series connected winding 13 and 17 is connected to a point 22 which is connected to the other end 25 of transformer 11 and to one end of load 23. The gate windings 14, 18 are connected in series with transformer 11 from point 20 to the other side 24 of load 23. The input voltage at 10 is raised by the autotransformer boost winding portion 11A so that a voltage larger than the input voltage can be made available at the output terminals 24 and 23 if required.

In normal operation under load, a current $I_2$ exists in one circuit and a load current $I_L$ exists in the main circuit. The ampere turns generated by $I_2$ and $I_L$ in the saturable reactors will be balanced by the ampere turns in the control winding. The voltage $V_3$ across the windings 13 and 17 of the saturable reactor is equal to the vector difference between the autotransformer $V_1$ and the voltage drop $V_2$ in reactor 21. Output voltage $V_L$ is equal to the autotransformer voltage $V_1$ reduced vectorially by the auxiliary winding voltage $V_3$, as reflected into the gate winding circuit. As an example, if the control current is now raised for a fixed value of load current, the current $I_2$ will increase so as to increase the voltage drop $V_2$ across the reactance and thereby reduce the voltage $V_3$ across the gate winding. This voltage reflected in the main circuit reduces the amount of voltage which opposes the autotransformer voltage and raises the output voltage to the load. It should be apparent that a decrease in control current will have the opposite effect so that the load voltage will be lowered, all other quantities being considered constant. In practical application, the D.C. control current for windings 15 and 19 would be controlled, for example, by voltage or current sensors suitably connected to the load circuit.

The desired value of load voltage for varying conditions of input voltage and load impedance can be obtained by appropriately selecting the values of the autotransformer windings, the value of reactance 21, and the design of the saturable reactors.

It should be apparent that details in the circuit can be changed without departing from the spirit of the invention except as defined in the appended claims.

What is claimed is:

1. In a power modulating system, the combination including an A.C. power supply, a transformer means connected to said A.C. power supply, saturable reactor means having a gate, an auxiliary and a control winding per core and having at least two core elements, the gate and auxiliary windings of each core element having the same number of turns and being connected in series with the respective windings of the other element, so as to provide at least two sets of series connected gate and auxiliary windings, an A.C. reactor connected to said transformer means in series with the set of series connected auxiliary windings, the set of series connected gate windings being connected to said transformer means in series with the load.

2. In a power modulating system, the combination including an A.C. power supply, an autotransformer means connected to said A.C. power supply, saturable reactor means having a gate, an auxiliary and a control winding per core and having at least two core elements, the gate and auxiliary windings of each core element having the same number of turns and being connected in series with the respective windings of the other element, so as to provide at least two sets of series connected gate and auxiliary windings, an A.C. reactor connected to the outer ends of said autotransformer means in series with the set of series connected auxiliary windings, the set of series connected gate windings being connected in series with the load and to opposite ends of said autotransformer.

References Cited

UNITED STATES PATENTS

| | | | |
|---|---|---|---|
| 2,700,128 | 1/1955 | Woerdemann | 323—89.12 X |
| 2,714,188 | 7/1955 | Scherer | 323—66 |
| 2,753,514 | 7/1956 | Muchnick | 323—66 |
| 3,238,468 | 3/1966 | Kelley | 323—89.1 X |
| 3,252,077 | 5/1966 | Schonholzer et al. | 323—89.12 X |

JOHN F. COUCH, *Primary Examiner.*

W. E. RAY, G. GOLDBERG, *Assistant Examiners.*